United States Patent
Harris et al.

(10) Patent No.: US 8,321,861 B2
(45) Date of Patent: Nov. 27, 2012

(54) NON-NATIVE PROGRAM EXECUTION ACROSS MULTIPLE EXECUTION ENVIRONMENTS

(75) Inventors: Peter William Harris, Cambridge (GB); Rodolph Gerard Jacques Ascanio Jean-Denis Perfetta, Cambridge (GB); Peter Brian Wilson, Cambridge (GB)

(73) Assignee: ARM Limited, Cambridge (GB)

( * ) Notice: Subject to any disclaimer, the term of this patent is extended or adjusted under 35 U.S.C. 154(b) by 1317 days.

(21) Appl. No.: 12/071,386

(22) Filed: Feb. 20, 2008

(65) Prior Publication Data

US 2009/0210874 A1  Aug. 20, 2009

(51) Int. Cl.
  G06F 9/455  (2006.01)
  G06F 9/44   (2006.01)
(52) U.S. Cl. .............................. 718/1; 712/227; 712/205
(58) Field of Classification Search ....... 718/1; 712/227
See application file for complete search history.

(56) References Cited

U.S. PATENT DOCUMENTS

| | | | |
|---|---|---|---|
| 5,621,912 A * | 4/1997 | Borruso et al. | 718/1 |
| 2002/0013892 A1* | 1/2002 | Gorishek et al. | 712/227 |
| 2004/0111584 A1* | 6/2004 | Arimilli et al. | 711/205 |
| 2005/0071824 A1* | 3/2005 | K. N. et al. | 717/138 |
| 2005/0172299 A1* | 8/2005 | Zhao et al. | 719/313 |
| 2005/0223220 A1* | 10/2005 | Campbell et al. | 713/164 |
| 2009/0187769 A1* | 7/2009 | Camiel | 713/189 |

* cited by examiner

*Primary Examiner* — Thomas Lee
*Assistant Examiner* — Terrell Johnson
(74) *Attorney, Agent, or Firm* — Nixon & Vanderhye P.C.

(57) ABSTRACT

A data processing system 2 executes non-native program instructions using either a first execution environment 14 or a second execution environment 22. The first execution environment identifies at runtime if non-native program instructions to be executed are marked as intended for execution by the second execution environment. When such instructions are encountered the first execution environment triggers performance of data processing operations as specified by the one or more marked program instructions performed by the second execution environment. When those processing operations as specified by the one or more marked program instructions have been completed, a return is made to the first execution environment.

18 Claims, 4 Drawing Sheets

Logical View

System View

NON-NATIVE PROGRAM EXECUTION ACROSS MULTIPLE EXECUTION ENVIRONMENTS

BACKGROUND OF THE INVENTION

1. Field of the Invention

This invention relates to the field of executing non-native program instructions, such as, for example, Java instructions, across multiple execution environments.

2. Description of the Prior Art

It is known to provide data processing systems with security systems which seek to provide a secure domain (mode(s)) of operation and a non-secure domain (mode(s)) of operation. The system may be switched between these domains of operation using tightly controlled mechanisms. Data and resources which are available in a secure mode may not be available in the non-secure mode. An example of such data processing systems are described in WO-A-2004-046738.

Whilst such systems provide a foundation for secure operation of those portions of the processing activity where security is required, it is nevertheless important that the code which executes when in a secure mode is carefully written and well understood so as not to introduce security vulnerabilities. One known technique for enhancing the security of the code executing in the secure mode is to use non-native program instructions in the secure mode executing in a virtual machine environment, such as Java instructions executing on a Java virtual machine within the secure mode. The additional isolation provided by the virtual machine provides a further layer of security for the code executing in the secure mode. A significant problem with this approach is that execution environments of the secure mode and the non-secure mode can be significantly different requiring two distinct development processes for their respective code and this introduces disadvantageous expense and complexity.

It is also known within the field of Java programming to use techniques such as Java Remote Method Invocation (RMI) which allows a distributed application to be split over multiple virtual machines. Such RMI techniques require that the user explicitly code the remote interface location and decide how to split the application at the programming stage. Furthermore, additional RMI "server-side" code has to be installed ahead of such a call being made and this introduces a disadvantageous degree of expense and complexity in the development of such code.

SUMMARY OF THE INVENTION

Viewed from one aspect the present invention provides a method of executing a computer program comprising non-native program instructions upon a data processing apparatus using:

a first execution environment provided by said data processing apparatus executing native program instructions to perform data processing operations as specified by non-native program instructions of said computer program; and a second execution environment provided by said data processing apparatus executing native program instructions to perform data processing operations as specified by non-native program instructions of said computer program, said method comprising:

performing data processing operations as specified by non-native program instructions using said first execution environment;

identifying at runtime with said first execution environment one or more marked program instructions of said computer program marked as executable by said second execution environment;

triggering with said first execution environment execution of data processing operations as specified by said one or more marked program instructions by said second execution environment;

performing said data processing operations as specified by said one or more marked program instructions using said second execution environment; and returning to performing of data processing operations as specified by said program instructions by said first execution environment.

The present technique recognizes that when executing non-native program instructions in a system having a first execution environment and a second execution environment it is advantageous to devolve control of the migration of code between the execution environments to the execution environments themselves with the non-native program instructions being marked as suitable for migration. This enables a programmer to develop a single stream of non-native program instruction code in a simplified manner and mark those portions of the code which should be executed in a different execution environment. The execution environments require a degree of integration therebetween in order to be able to handle the migration of tasks, but the advantages provided in simplifying the task of the programmer more than justify the constraints upon the combination of execution environments.

It will be appreciated that the execution environments could take a variety of different forms, such as comprising separate interpreters. However, the invention is well suited to embodiments in which the first and second execution environments are first and second virtual machine environments. Such virtual machine environments may be associated, for example, with the Java programming language to which the present techniques are particularly well suited.

Whilst the split between execution environments could be performed for a variety of different reasons, the techniques are well suited to systems in which the first execution environment is operating in a non-secure mode and the second execution environment is operating in a secure mode (the secure mode can have access to data and hardware resources not accessible in the non-secure mode). In this way, a clear partitioning with enhanced security can be provided between different portions of the code whilst the programmer is relieved of the burden of having to work with separate streams of program instructions and/or programming for significantly different programming environments. In this way using a split virtual machine design in a system having a secure mode and a non-secure mode permits the portion of the code running on the virtual machine in the secure mode to have access to hardware and data resources that are not accessible to the code running on the virtual machine in the non-secure mode thereby significantly increasing the security of the design.

Such systems will typically employ a non-secure operating system within the non-secure mode and a secure operating system within the secure mode. The secure operating system can be smaller and provide fewer features than the non-secure operating system. This gives the secure operating system the advantage of being more tightly controlled and less complex so as to present fewer security vulnerabilities.

In some embodiments the second execution environment can perform one or more security validation operations upon the marked instructions before they are performed. This extra level of security, such as signature checking, would significantly reduce overall performance if it was carried out in respect of all of the non-native program instructions executing both environments, but can advantageously improve security when performed in respect of the secure code executing in the secure mode with a relatively minor impact on overall performance since such secure code typically only represents a small proportion of the total amount of code being executed.

The second environment can include one or more code library entries that are not present within the first execution environment. This can enhance security and ensure proper partitioning since code requiring those class libraries (e.g. encryption related libraries) will only be able to execute within the second execution environment.

The first execution environment can use acceleration techniques, e.g. just-in-time (JIT) compilation, which are not used in the second execution environment. Acceleration techniques may reduce security.

The marking of program instructions can be performed in a variety of different ways. In the context of Java instructions, the marked program instructions may be a Java class marked as executable by the second execution environment.

It will be appreciated in the above context, and in respect of other more general uses of the present technique, that backward compatibility is provided since the marking of program instructions for execution in the second execution environment may be ignored within systems which do not provide such a second execution environment. This would reduce the advantages achieved by using the second execution environment, such as enhanced security, but would nevertheless permit the code to be executed.

The first execution environment and the second execution environment can be configured in different ways in order to match the priorities associated respectively therewith. As an example, one of the environments may be configured for accelerated performance using techniques such as just-in-time (JIT) compilation, whereas the other environment may be configured for improved security with techniques such as signature checking and in-line code validation.

The first execution environment and the second execution environment set up and manage communication between program instructions executed respectfully therein.

The marking of program instructions may be achieved using existing features of a programming language, such as appropriate metatags, by using a marked class in the case of a Java program, or using a marked interface in the case of such a Java program. It is also possible that the marked program instructions can be identified using data external to the computer program, but accessible to the first execution environment.

Viewed from another aspect the present invention provides a data processing apparatus for executing a computer program comprising non-native program instructions said data processing apparatus having a first execution environment provided by said data processing apparatus executing native program instructions to perform data processing operations as specified by non-native program instructions of said computer program; and a second execution environment provided by said data processing apparatus executing native program instructions to perform data processing operations as specified by non-native program instructions of said computer program; wherein said apparatus is configured to:

perform data processing operations as specified by non-native program instructions using said first execution environment;

identify at runtime with said first execution environment one or more marked program instructions of said computer program marked as executable by said second execution environment;

trigger with said first execution environment execution of data processing operations as specified by said one or more marked program instructions by said second execution environment;

perform said data processing operations as specified by said one or more marked program instructions using said second execution environment; and return to performing of data processing operations as specified by said program instructions by said first execution environment.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
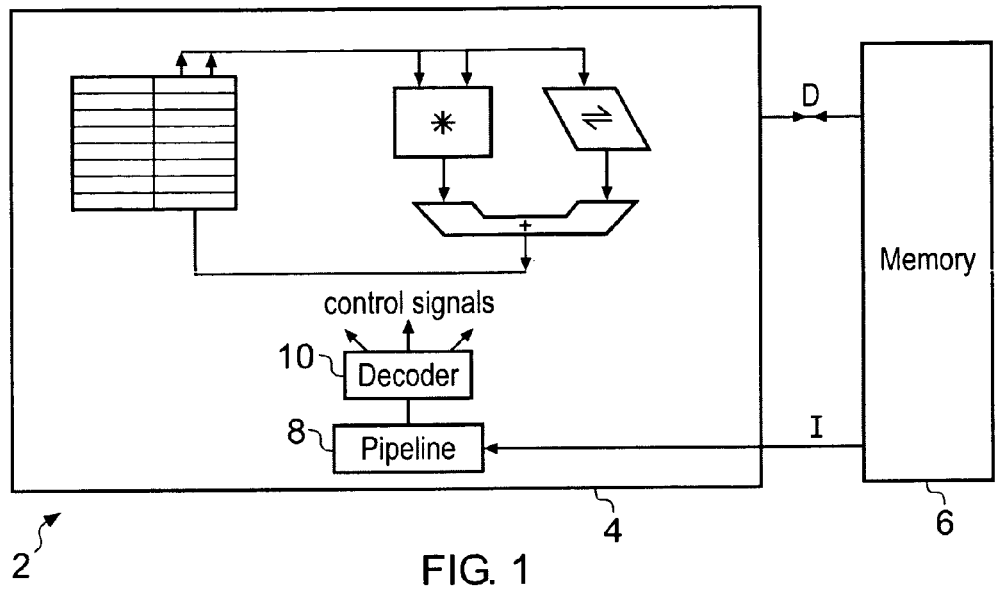
FIG. 1 schematically illustrates a data processing apparatus for executing program instructions, including non-native program instructions.

FIG. 1 illustrates a data processing apparatus 2 including a processor core 4 coupled to a memory 6. The memory 6 stores data and program instructions. The program instructions can include non-native program instructions, such as Java program instructions, which are to be executed using virtual machine environments. The provision of virtual machine environments in itself is a known technique to those in this technical field.

It will be appreciated that the processor core 4 receives into its instruction pipeline 8 native instructions and that the instruction decoder 10 then generates appropriate control signals to control the other processing elements within the processor core 4 to perform the required processing operations. When executing non-native program instructions an execution environment is provided by a virtual machine coded as native program instructions. The virtual machine receives the non-native program instructions as a virtual instruction stream which is interpreted/decoded so as to perform manipulations equivalent to if those non-native program instructions had been executed by a physical machine corresponding to the virtual machine modeled by the native program instructions implementing the virtual machine.

Figure 2:
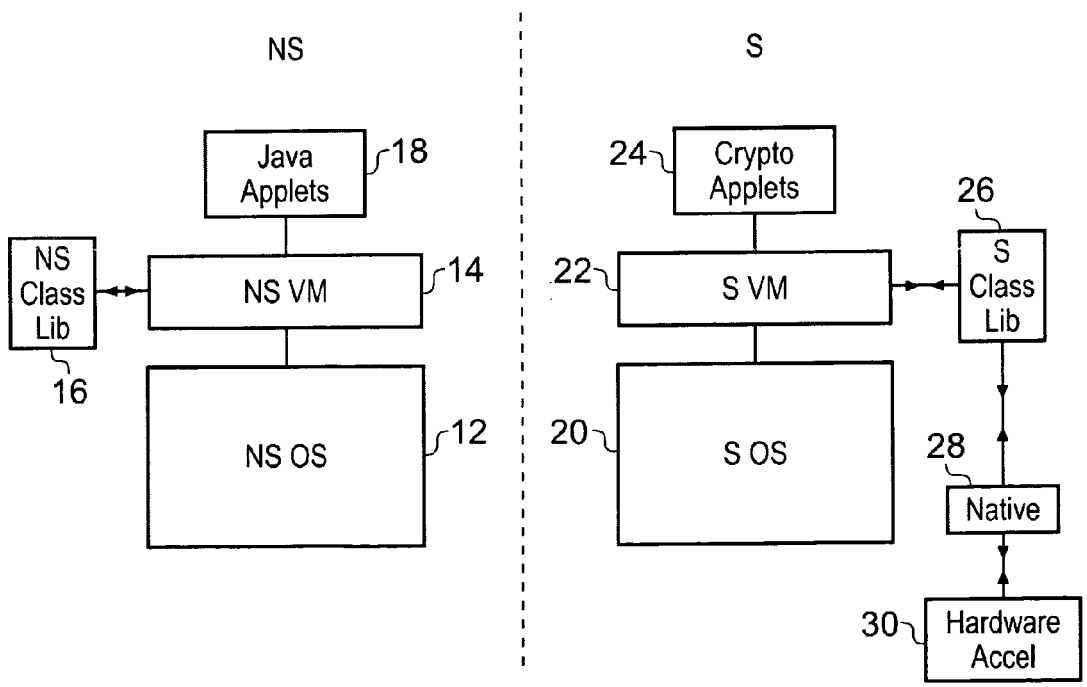
FIG. 2 schematically illustrates the provision of non-secure and secure domains with their respective execution environments in accordance with the present techniques.

FIG. 2 illustrates the provision of a system having a non-secure domain NS and a secure domain S. A description of a processor providing such secure and non-secure domains can be found in PCT/GB2004/046738 (the content of which is incorporated herein by reference). Within the non-secure domain NS there is provided a non-secure operating system 12, a non-secure virtual machine 14 having a non-secure class library 16 (or more generally code library in other non-Java embodiments) and a collection of Java applets 18 which are to be executed using the non-secure virtual machine 14. Within the secure domain S there is provided a secure operating system (kernel) 20 supporting a secure virtual machine 22 for executing secure code portions, such as cryptographic applets 24 using an associated secure class library 26. The secure class library 26 can provide access via a native instruction interface 28 to hardware resources, such as hardware acceleration resources 30 which are only accessible within the secure domain S.

Figure 3:
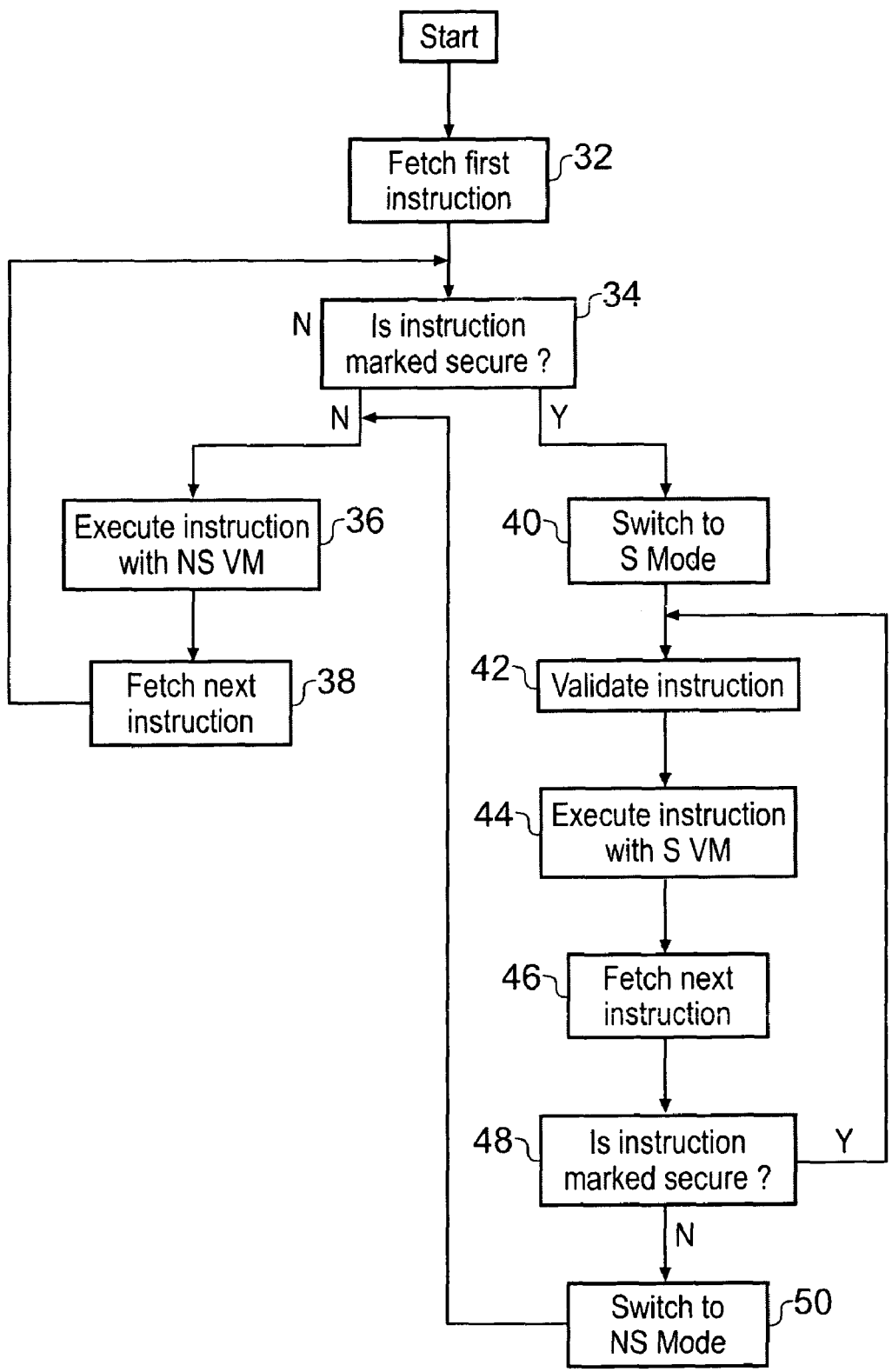
FIG. 3 is a flow diagram illustrating the identifying of marked instructions and the control of execution in different execution environments.

FIG. 3 is a flow diagram illustrating the processing of non-native program instructions as divided between the secure domain S and the non-secure domain. The process commences with the system operating in the non-secure domain with the fetching of a first instruction at step 32. Step 34 identifies whether that first instruction (or class in the case of a Java class) is marked as secure. This marking may be using a feature of the programming language concerned, such as metatags, an external data source, such as a list of which instructions are marked and which are not marked, or some other marking technique.

If the determination at step 34 is that the instruction is not marked as executable in the secure domain S, then processing proceeds to step 36 where the instruction is executed using the non-secure virtual machine 14. Step 38 then fetches the next instruction and processing is returned to step 34.

If the determination at step 34 is that the instruction is marked as secure, then processing proceeds to step 40 at which a switch is made to the secure domain S. The mechanisms for switching to this secure domain may include the mechanisms described in WO-A-2004-046738. It will be appreciated that the determination at step 34 is carried out at runtime by the non-secure virtual machine 14. The action required by the programmer is the marking of the non-native program instructions, or groups or classes thereof, as executable by the secure virtual machine 22 in the secure domain S.

Following the switch to the secure domain at step 40, step 42 validates the instruction using the secure virtual machine. This validation could take a variety of different forms, such as, for example, checking a signature associated with a sequence of instructions or a class of instructions. If the instruction does not pass validation, then separate processing to handle the security violation will be initiated. The instruction will not be permitted to execute. This separate processing is not shown in FIG. 3.

Once the validation of the instruction at step 42 has been completed, step 44 executes the instruction using the secure virtual machine 20. Step 46 fetches the next instruction and this next instruction is checked at step 48 to see if it is also marked as executable in the secure domain S. If the determination at step 48 is that the next instruction is marked as executable in the secure domain, then processing is returned to step 42. If the determination at step 48 is that the next instruction is marked as not executable in the secure domain, then step 50 serves to switch processing back to the non-secure domain NS and returns processing to step 36.

It will be appreciated from the above that when the switch is made between the non-secure domain and the secure domain such that the non-secure virtual machine 14 and the secure virtual machine 22 exchange responsibility for executing the non-native instructions, state and other information needs to be passed between the different virtual machines 14, 22. This information can be directly passed between the virtual machines 14 and 22 or via their respective operating systems 12, 20. The non-secure virtual machine 14 and the secure virtual machine 22 provide a communication mechanism therebetween and to operate cooperatively so as to permit runtime migration of execution between the non-secure domain and the secure domain. A variety of different protocols can be used to pass information between the non-secure virtual machine 14 and the secure virtual machine 22 as necessary. These protocols can be similar to those used for the previously mentioned RMI techniques.

Figure 4:
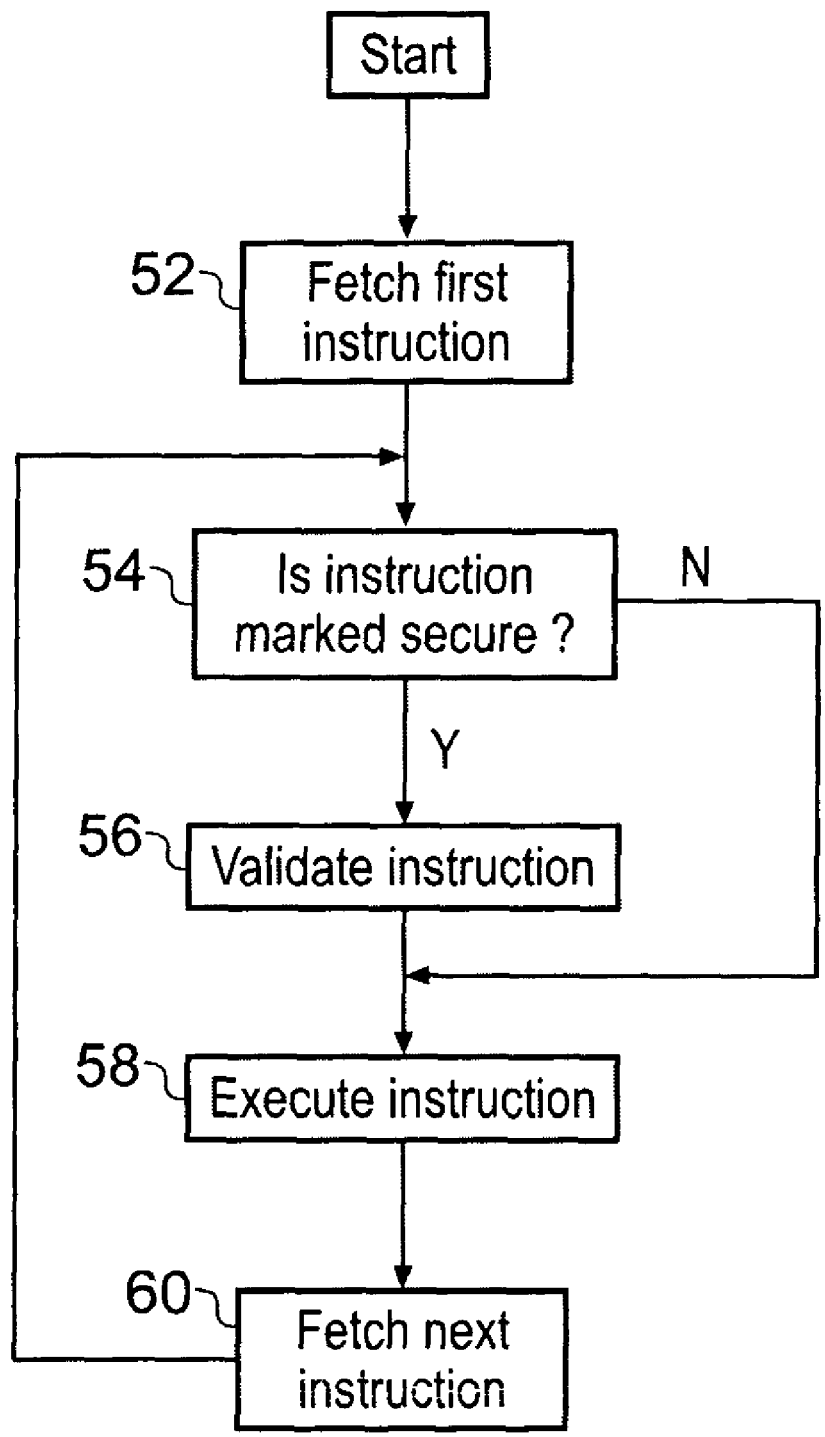
FIG. 4 is a flow diagram illustrating the execution of program instructions including a validation technique.

FIG. 4 is a flow diagram illustrating a further embodiment of the present technique in which two different execution environments are provided for the execution of non-native program instructions. These two different execution environments can be formed as a common virtual machine operating either with or without validation. Operation without validation comprises a first execution environment for the execution of non-native program instructions that are not marked as secure. Execution with validation constitutes a second execution environment for non-native program instructions that are marked as secure.

At step 52 a first instruction is fetched. Step 54 identifies whether or not the instruction is marked as secure. If the instruction is marked as secure, then processing proceeds to step 56 where validation of instruction is performed. If the instruction is not marked as secure, then step 56 is bypassed. Step 58 executes the virtual machine provided. Step 60 then fetches the next instruction and processing is returned to step 54.

Figure 5:
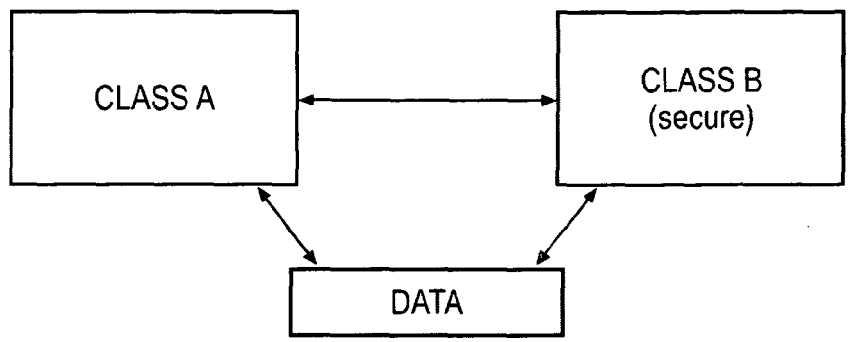
FIG. 5 is a logical view of the separation of different classes within a Java program.

FIG. 5 is a diagram schematically illustrating a logical view of a Java program using the present technique. Respective classes A and B are provided. The program instructions of class B are marked as secure and should be executed in the secure domain with a secure virtual machine when this is available. If this is not available, then the class B instructions can be executed with the non-secure virtual machine at the cost of a reduction in the security of the system. The instructions from class A and class B share a pool of data which they manipulate.

Figure 6:
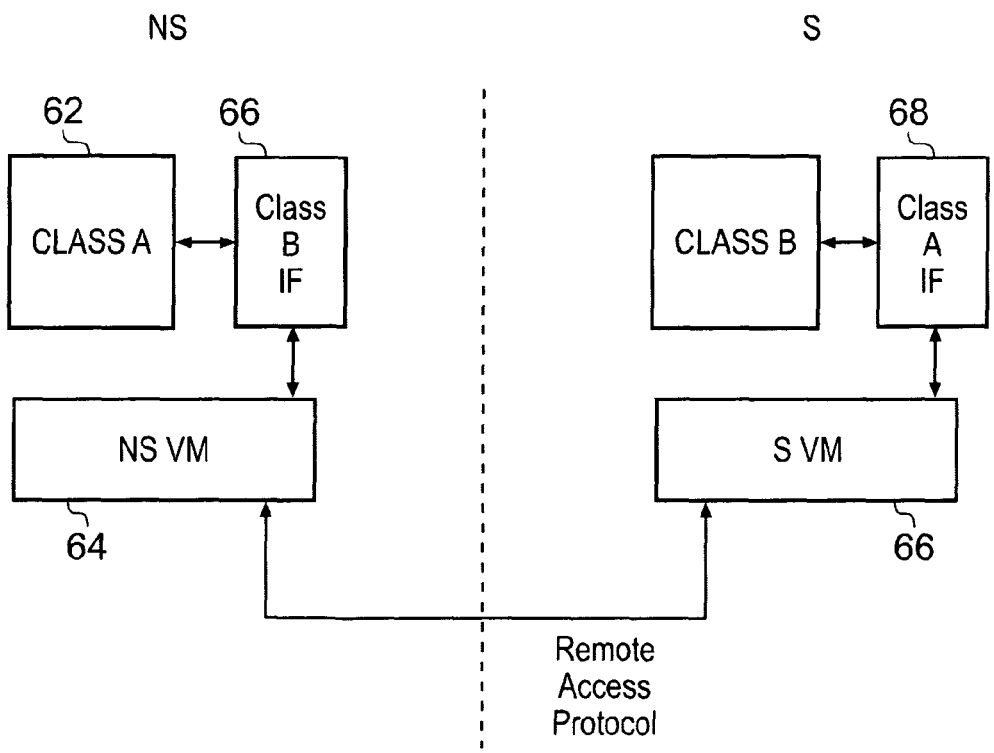
FIG. 6 is a system view of the separation of Java classes between a non-secure domain (mode) and a secure domain (mode).

FIG. 6 is a system view of the way in which the processing of the non-native program of FIG. 5 may be arranged. The class A program instructions 62 execute in the non-secure domain using the non-secure virtual machine 64. When a non-native program instruction is identified that is marked for execution with the secure mechanisms, then an interface to the class B program instructions 66 is called and the non-secure virtual machine 64 generates a call to the secure domain such that the marked non-native program instructions are executed in that secure domain. There is a switch of domain from the non-secure domain to the secure domain and a remote access protocol is used to communicate with a secure virtual machine 66 to commence execution of the marked non-native program instructions. When these non-native program instructions that are marked as secure call back to non-marked instructions, then a call is made to a class A interface 68 and the secure virtual machine 66 handles the passing of control back to the non-secure virtual machine 64 with an appropriate domain switch and the passing of data values using the remote access protocol.

In other embodiments the marked code in the non-secure domain can be dummy code with the corresponding secure classes being downloaded or loaded from disc directly into the virtual machine in the secure domain (e.g. subject to the secure virtual machine negotiating access to these secure classes using a device certificate validity check or other security measures). In this way the security and/or integrity of the system can be checked by the secure virtual machine before secure classes are released to the non-secure virtual machine for execution.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of executing a computer program comprising non-native program instructions upon a data processing apparatus using a first virtual machine environment provided by said data processing apparatus executing native program instructions to perform data processing operations as specified by non-native program instructions of said computer program, and a second virtual machine environment provided by said data processing apparatus executing native program instructions to perform data processing operations as specified by non-native program instructions of said computer program, said method comprising the steps of:

performing data processing operations as specified by non-native program instructions using said first virtual machine environment;

identifying, at runtime with said first virtual machine environment, one or more marked non-native program instructions of said computer program marked as executable by said second virtual machine environment;

triggering, with said first virtual machine environment, execution of data processing operations as specified by said one or more marked non-native program instructions by said second virtual machine environment;

performing said data processing operations as specified by said one or more marked non-native program instructions using said second virtual machine environment; and returning to performing of data processing operations as specified by said program instructions by said first virtual machine environment.

2. A method as claimed in claim 1, wherein said data processing apparatus has a secure mode of operation and a non-secure mode of operation, at least some data being accessible when said data processing apparatus is in said secure mode and not being accessible when said data processing apparatus is in said non-secure mode.

3. A method as claimed in claim 2, wherein said first virtual machine environment operates in said non-secure mode and does not operate in said secure mode and said second virtual machine environment operates in said secure mode.

4. A method as claimed in claim 2, wherein at least some hardware resources are accessible when said data processing apparatus is in said secure mode and are not accessible when said data processing apparatus is in said non-secure mode.

5. A method as claimed in claim 2, wherein a non-secure operating system executes in said non-secure mode and a secure operating system executes in said secure mode.

6. A method as claimed in claim 1, wherein said second virtual machine environment performs one or more security validation operations upon said one or more marked non-native program instructions before performing said data processing operations as specified by said one or more marked non-native program instructions.

7. A method as claimed in claim 1, wherein said second virtual machine environment includes one or more code library entries not present within said first virtual machine environment.

8. A method as claimed in claim 1, wherein said first virtual machine environment uses one or more acceleration techniques not used by said second virtual machine environment.

9. A method as claimed in claim 1, wherein said second virtual machine environment uses one or more validation techniques not used by said first virtual machine environment.

10. A method as claimed in claim 1, wherein said computer program comprising non-native program is a Java computer program.

11. A method as claimed in claim 10, wherein said one or more marked non-native program instructions are part of a Java class marked as executable by said second virtual machine environment.

12. A method as claimed in claim 1, wherein said first virtual machine environment comprises a virtual machine environment operating in accordance with a first configuration and said second virtual machine environment comprises said virtual machine environment operating in accordance with a second configuration.

13. A method as claimed in claim 1, wherein said first virtual machine environment and said second virtual machine environment set up and manage communication between program instructions executed with said first virtual machine environment and marked non-native program instructions executed by said second virtual machine environment.

14. A method as claimed in claim 1, wherein said one or more marked non-native program instructions are marked using a feature of a programming language of said computer program.

15. A method as claimed in claim 14, wherein said computer program is a Java program and said one or more marked non-native program instructions are part of a marked class.

16. A method as claimed in claim 14, wherein said computer program is a Java program and said one or more marked non-native program instructions are accessed via a marked interface.

17. A method as claimed in claim 1, wherein said one or more marked non-native program instructions are marked using data external to said computer program.

18. A data processing apparatus for executing a computer program comprising non-native program instructions said data processing apparatus having a first virtual machine environment provided by said data processing apparatus executing native program instructions to perform data processing operations as specified by non-native program instructions of said computer program and a second virtual machine environment provided by said data processing apparatus executing native program instructions to perform data processing operations as specified by non-native program instructions of said computer program, wherein said data processing apparatus is configured to:

perform data processing operations, as specified by non-native program instructions, using said first virtual machine environment;

identify, at runtime with said first virtual machine environment, one or more marked non-native program instructions of said computer program marked as executable by said second virtual machine environment;

trigger, with said first virtual machine environment, execution of data processing operations as specified by said one or more marked non-native program instructions by said second virtual machine environment;

perform said data processing operations as specified by said one or more marked non- native program instructions using said second virtual machine environment; and return to performing of data processing operations as specified by said program instructions by said first virtual machine environment.

* * * * *